(12) United States Patent
Fitzgerald

(10) Patent No.: US 12,075,909 B2
(45) Date of Patent: Sep. 3, 2024

(54) COOLER TABLE

(71) Applicant: FC Industries, LLC, Atlanta, GA (US)

(72) Inventor: Christian Evan Fitzgerald, Atlanta, GA (US)

(73) Assignee: FC Industries, LLC, Atlanta, GA (US)

( * ) Notice: Subject to any disclaimer, the term of this patent is extended or adjusted under 35 U.S.C. 154(b) by 3 days.

(21) Appl. No.: 17/752,164

(22) Filed: May 24, 2022

(65) Prior Publication Data

US 2022/0369804 A1    Nov. 24, 2022

Related U.S. Application Data

(60) Provisional application No. 63/192,459, filed on May 24, 2021.

(51) Int. Cl.
*A47B 13/08*    (2006.01)

(52) U.S. Cl.
CPC ...... *A47B 13/08* (2013.01); *A47B 2200/0085* (2013.01)

(58) Field of Classification Search
CPC .......... A47B 13/08; A47B 2200/0085
USPC ...... 108/59, 25, 26, 42, 152, 35, 36, 33, 34, 108/157.13; 248/239, 250; 62/457.7; 220/592.2
See application file for complete search history.

(56) References Cited

U.S. PATENT DOCUMENTS

| | | | |
|---|---|---|---|
| 510,282 A * | 5/1893 | Moody | |
| 3,111,297 A * | 11/1963 | Conner | E06C 7/14 182/189 |
| 3,394,666 A | 7/1968 | Pearlman | |
| 3,873,114 A | 3/1975 | Brown | |
| 3,880,485 A * | 4/1975 | Schmelzer | A47B 3/10 312/282 |
| 4,515,421 A * | 5/1985 | Steffes | A45C 15/00 312/351 |
| D289,954 S | 5/1987 | Worrell et al. | |
| 4,843,977 A * | 7/1989 | Bridges | A47B 96/061 211/90.01 |
| 4,895,418 A * | 1/1990 | Medellin | B67D 1/06 312/249.7 |
| D311,828 S | 11/1990 | Clark et al. | |
| 4,995,322 A | 2/1991 | Frederick | |
| 5,092,652 A | 3/1992 | Macaluso | |
| D343,084 S | 1/1994 | Deimen et al. | |
| 5,947,032 A | 9/1999 | Meier | |

(Continued)

FOREIGN PATENT DOCUMENTS

| JP | D1724705 | 9/2022 |
|---|---|---|
| WO | D205740-008 | 2/2020 |

OTHER PUBLICATIONS

Images of Coolers with fold-out tables, publicly available prior to May 24, 2021, 1 pg.

(Continued)

*Primary Examiner* — Janet M Wilkens
(74) *Attorney, Agent, or Firm* — Taylor English Duma LLP

(57) ABSTRACT

A table assembly can include a table including a support portion and a mounting portion; and a mounting bracket defining a mounting slot, the mounting slot receiving the mounting portion. The support portion can be cantilevered.

(Continued)

The mounting bracket can define a top side and a bottom side; and the mounting slot can extend from the top side to the bottom side.

18 Claims, 14 Drawing Sheets

(56) References Cited

U.S. PATENT DOCUMENTS

| | | | |
|---|---|---|---|
| 5,953,999 | A | 9/1999 | Kanehl |
| 6,796,249 | B1* | 9/2004 | Hiras ............... A47B 96/02 |
| | | | 108/157.13 |
| D563,126 | S | 3/2008 | Morris et al. |
| 7,451,709 | B2 | 11/2008 | Swartfager et al. |
| 8,075,073 | B2 | 12/2011 | Huang |
| D682,282 | S | 5/2013 | Steinfeld |
| D683,348 | S | 5/2013 | Xiang et al. |
| D700,792 | S | 3/2014 | Melton |
| D735,509 | S | 8/2015 | Roth |
| D857,019 | S | 8/2019 | Mecchella |
| D863,219 | S | 10/2019 | Chen |
| 10,464,459 | B2 | 11/2019 | Pajic |
| D881,892 | S | 4/2020 | Mecchella |
| D929,407 | S | 8/2021 | Mecchella |
| D996,093 | S | 8/2023 | Ramos et al. |
| 2002/0189502 | A1* | 12/2002 | Kerber ............... G07G 1/0018 |
| | | | 108/42 |
| 2003/0173361 | A1* | 9/2003 | Lee ............... B65D 25/04 |
| | | | 220/23.88 |
| 2011/0000404 | A1* | 1/2011 | Lauther ............... A47B 5/06 |
| | | | 62/457.7 |
| 2016/0060016 | A1* | 3/2016 | Angelozzi ............... A47B 5/02 |
| | | | 220/592.2 |

OTHER PUBLICATIONS

SW-MOTECH TRAX Gear+ Camping Table Top for ALU-BOX, available prior to May 24, 2021, 1 pg.

TraX ALU-BOX Camping Table Legs, available prior to May 24, 2021, 1 pg.

Fitzgerald, Christian Evan; Ex Parte Quayle Action for U.S. Appl. No. 29/785,161, filed May 21, 2021, mailed Feb. 21, 2024, 22 pgs.

NODOCA Desk Extender, Amazon Product Listing (posted Aug. 31, 2023), Retrieved from the Internet (Feb. 8, 2024) URL: https://www.amazon.com/dp/B09WY9CN PF/ref= (Year: 2023), 1 pg.

OUGIC Extender Tray, Amazon Product Listing (posted Oct. 1, 2021), Retrieved from the Internet (Fb. 8, 2024) URL: https://www.amazon.com/OUGIC-Ergonomics-Extender-Punch-Free-Foldable/dp/B09H MXDZ1P/ref= (Year: 2021), 1 pg.

Pacbak MK Cooler, Salmon Trout Steelheader Product Listing (Post date unknown), Retrieved from the Internet (Feb. 8, 2024) URL: https://www.salmontroutsteelheader.com/blogs/product-reviews/pacbak-p88-mk-cooler (Year: 2024), 1 pg.

Fitzgerald, Christian Evan; Notice of Allowance for U.S. Appl. No. 29/785,161, filed May 24, 2021, mailed May 14, 2024, 12 pgs.

* cited by examiner

COOLER TABLE

CROSS-REFERENCE TO RELATED APPLICATIONS

This application claims the benefit of U.S. Provisional Application No. 63/192,459, filed on May 24, 2021, which is hereby incorporated by reference in its entirety.

TECHNICAL FIELD

This disclosure relates to a table. Specifically, this disclosure relates to a table for mounting to a cooler.

BACKGROUND

Coolers are commonly brought along for outdoor events and activities, such as picnics, camping, tailgates, fishing, and other endeavors. In outdoor settings, there often are limited flat surfaces available to place items, such as foods and/or beverages, and it can be desirable to avoid placing these items on the ground where they may get dirty, stepped on, or eaten by animals or insects. Sometimes, people place items on top of the cooler itself, which then renders the cooler inconvenient to open.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a table assembly comprising a table comprising a support portion and a mounting portion; and a mounting bracket defining a mounting slot, the mounting slot receiving the mounting portion.

Also disclosed is a cooler assembly comprising: a cooler; and a table assembly comprising: a table comprising a support portion and a mounting portion; and a mounting bracket defining a mounting slot, the mounting slot receiving the mounting portion, the mounting bracket coupled to the cooler.

Also disclosed is a a method for utilizing a table assembly comprising a table and a mounting bracket, the method comprising: aligning a mounting portion of the table with a mounting slot of the mounting bracket; and inserting the mounting portion into the mounting slot to couple the table to the mounting bracket.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
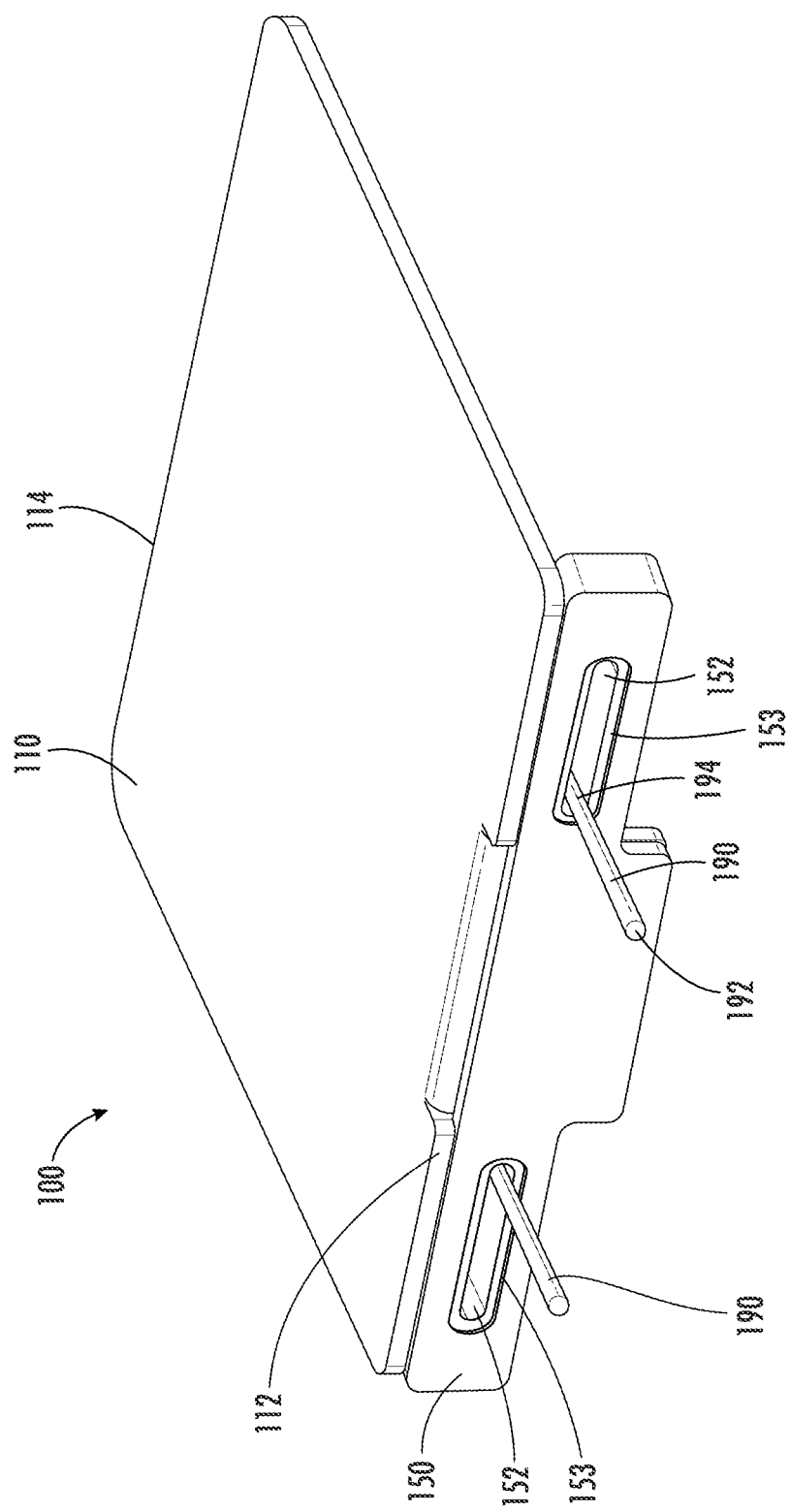
FIG. 1 is a perspective rear view of a table assembly comprising a table, a mounting bracket, and at least one fastener in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a table assembly and associated methods, systems, devices, and various apparatus. The table assembly can comprise a table and a mounting bracket. It would be understood by one of skill in the art that the disclosed table assembly is described in but a few exemplary aspects among many. No particular terminology or description should be considered limiting on the disclosure or the scope of any claims issuing therefrom.

FIG. 1 is a perspective rear view of a table assembly 100 comprising a table 110, a mounting bracket 150, and at least one fastener 190. The table 110 can define a first table end 112 and a second table end 114. The first table end 112 can be positioned opposite from the second table end 114. As shown, the mounting bracket 150 can be coupled to the table 110. Specifically, the first table end 112 can be coupled to the mounting bracket 150. In the present aspect, the second table end 114 can be cantilevered, such that the table 110 can be unsupported except for at the first table end 112.

The mounting bracket 150 can define at least one fastener hole 152. The at least one fastener 190 can extend through the at least one fastener hole 152. The mounting bracket 150 can define a countersink 153 around the at least one fastener hole 152. In the aspect shown, the mounting bracket 150 can define a pair of fastener holes 152, and the table assembly 100 can comprise two fasteners 190. The fasteners 190 can extend through different fastener holes 152 from one another. In other aspects, the table assembly 100 can comprise greater or fewer than two fasteners 190.

In the present aspect, each fastener 190 can comprise an elongated member 192 and a retention member 194, as demonstrated by the right fastener 190 with respect to the present viewing angle. The elongated member 192 can extend through the fastener hole 152, and the retention member 194 can couple to the elongated member 192 to secure the elongated member 192 in the fastener hole 152.

Figure 2:
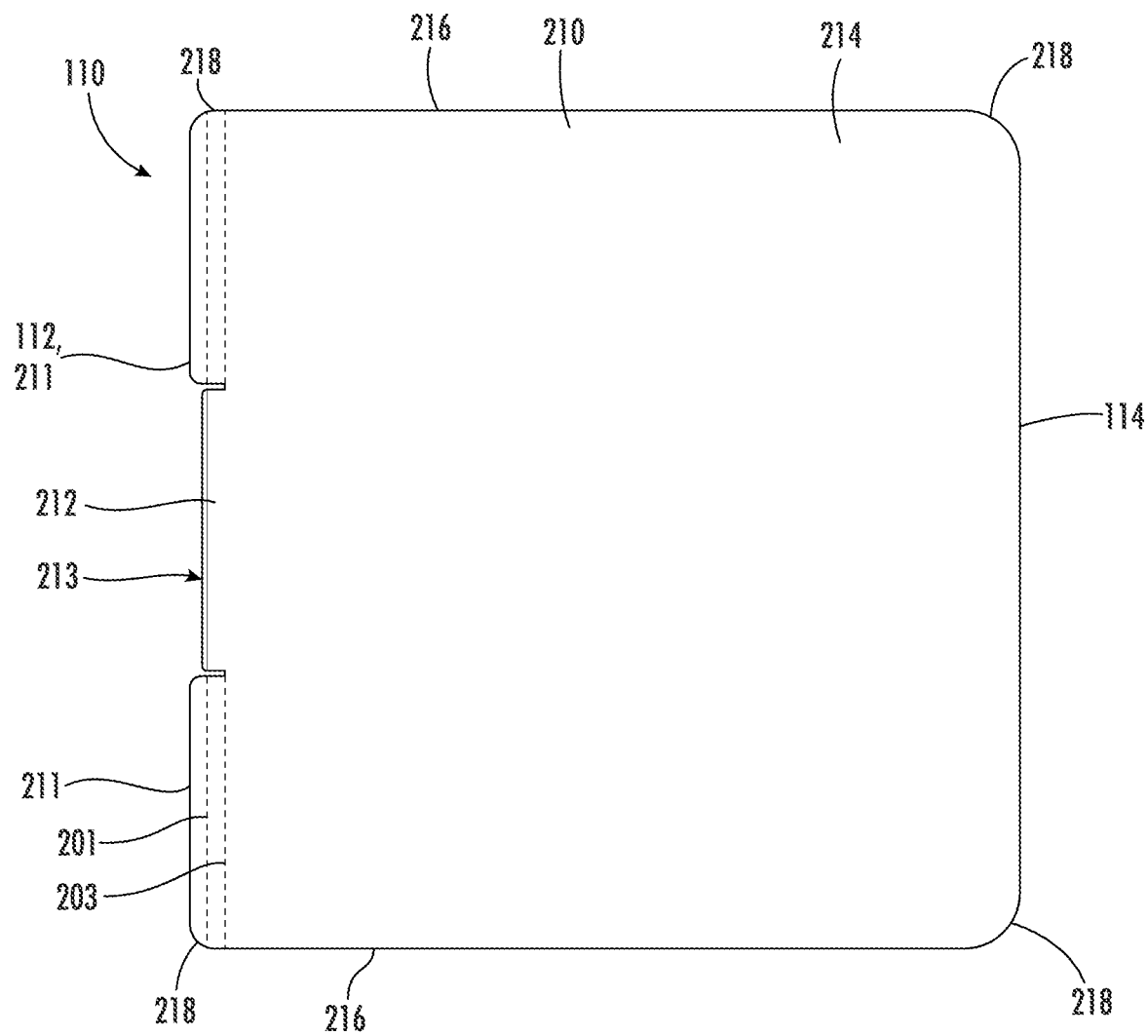
FIG. 2 is a top view of the table of FIG. 1.

FIG. 2 is a top view of the table 110 of FIG. 1. The table 110 can define a substantially planar top surface 210. The table 110 can comprise a mounting portion 212 and a support portion 214. When coupled to the mounting bracket 150, as shown in FIG. 1, specifically, the mounting portion 212 can be coupled to the mounting bracket 150, and the support portion 214 can be cantilevered outwards from the mounting bracket 150.

The first table end 112 can be defined by the mounting portion 212 and the support portion 214. The support portion 214 can define the second table end 114. The support portion 214 can define a pair of sides 216 extending between the table ends 112,114. The support portion 214 can define a transition 218 at each intersection between the sides 216 and the table ends 112,114, such as a chamfer, round, or radius. In some aspects, corners (not shown) can be defined at each intersection between the sides 216 and the table ends 112, 114. In some aspects, some intersections can define corners and some can define transitions 218. Some intersections can define different types of transitions 218.

In the aspect shown, the support portion 214 can define ears 211 on either side of the mounting portion 212. The ears 211 can partially define the first table end 112. In the aspect shown, the ears 211 can extend beyond the mounting portion 212. As demonstrated by line 201, in some aspects, the ears 211 can terminate flush with or slightly inward from an outer surface 213 of the mounting portion 212. The outer surface 213 can be defined by the mounting portion 212 facing away from the second table end 114. As demonstrated by line 203, in some aspects, the support portion 214 may not define the ears 211, and the mounting portion 212 can extend outwards from the support portion 214. In each demonstrated aspect, the support portion 214 can define the transitions 218 at the intersections between the sides 216 and the first table end 112, such as a chamfer, round, or radius.

Figure 3:
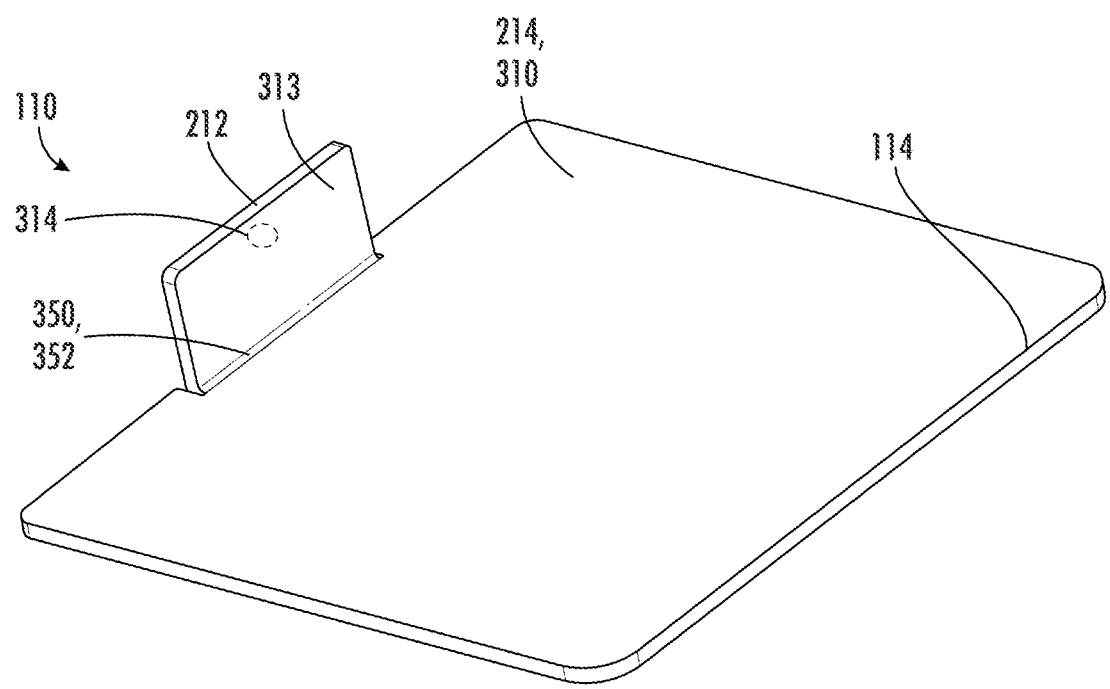
FIG. 3 is a bottom perspective view of the table of FIG. 1.

FIG. 3 is a bottom perspective view of the table 110 of FIG. 1. The support portion 214 can define a substantially planar bottom surface 310. The mounting portion 212 can extend downwards from the bottom surface 310. An inner surface 313 defined by the mounting portion 212 can face the second table end 114. As demonstrated by the dashed line, in some aspects, the mounting portion 212 can define a mounting hole 314 extending through the mounting portion 212 from the inner surface 313 to the outer surface 213 (shown in FIG. 2). In the present aspect, the inner surface 313 of the mounting portion 212 can be substantially perpendicular to the bottom surface 310 of the support portion 214. In the present aspect, the table 110 can be formed from a sheet or plate of material, such as a metal for example and without limitation, and the mounting portion 212 can be plastically bent relative to the support portion 214. In such aspects, a bend 350 can be defined between the mounting portion 212 and the support portion 214, and the bend 350 can define a fillet 352. In some aspects, the table 110 can be molded, such as from a polymer or composite for example and without limitation.

Figure 4:
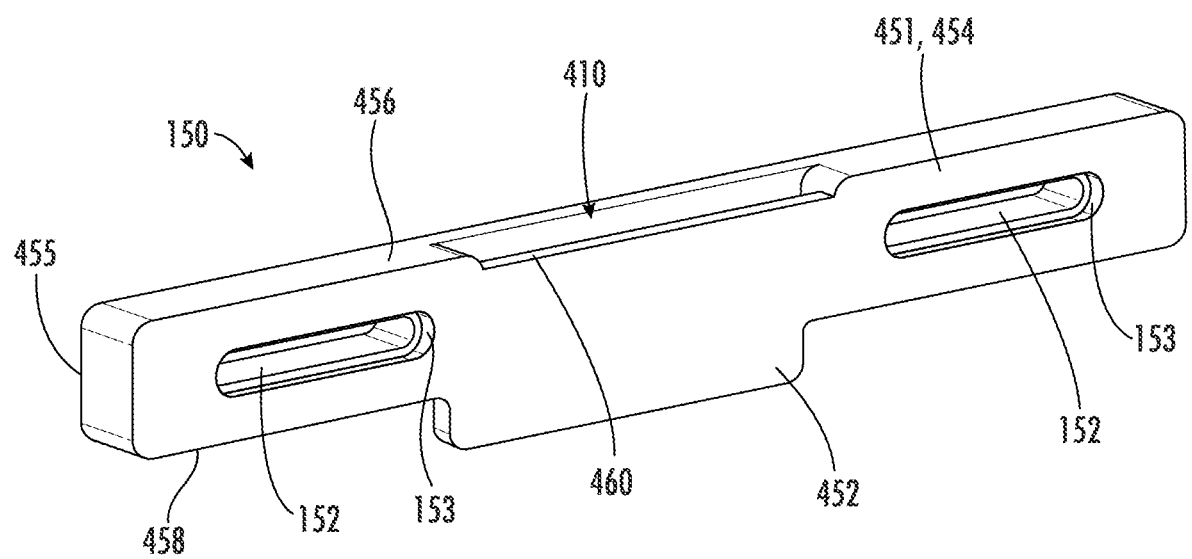
FIG. 4 is a front perspective view of the mounting bracket of FIG. 1.

FIG. 4 is a front perspective view of the mounting bracket 150 of FIG. 1. The mounting bracket 150 can comprise a main body 451 and a support tab 452. The main body 451 of the mounting bracket 150 can define a rear side 455 and a front side 454, defined opposite from the rear side 455. The fastener holes 152 can extend through the main body 451 from the front side 454 to the rear side 455. In the present aspect, each fastener hole 152 can be a slot. In some aspects, the fastener holes 152 can be circular holes. The front side 454 can also define countersinks 153 around each fastener hole 152, similar to the countersinks 153 shown in FIG. 1, which can be defined by the rear side 455.

The main body 451 can define a top side 456 and a bottom side 458. The support tab 452 can extend downwards from the bottom side 458 of the main body 451 and away from the top side 456. In the present aspect, the support tab 452 can be positioned at the rear side 455.

Figure 5:
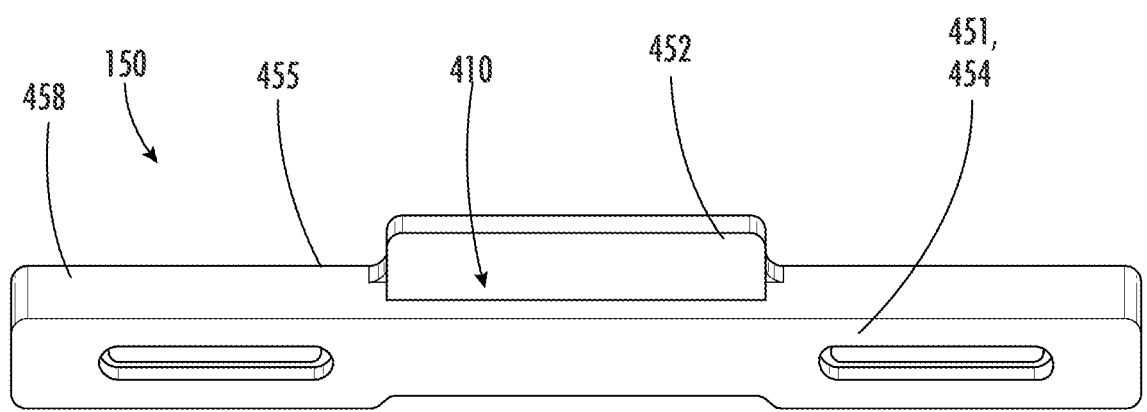
FIG. 5 is a bottom perspective view of the mounting bracket of FIG. 1.

FIG. 5 is a bottom perspective view of the mounting bracket 150 of FIG. 1. As shown in FIGS. 4 and 5, the main body 451 of the mounting bracket 150 can define a mounting slot 410 extending from the top side 456 to the bottom side 458. As shown by FIG. 4, the top side 456 can define a recessed lip 460 between the mounting slot 410 and the front side 454. As shown by FIG. 5, the support tab 452 can extend along a width of the mounting slot 410. Additionally, the support tab 452 can extend between the mounting slot 410 and the rear side 455 in thickness.

Figure 11:
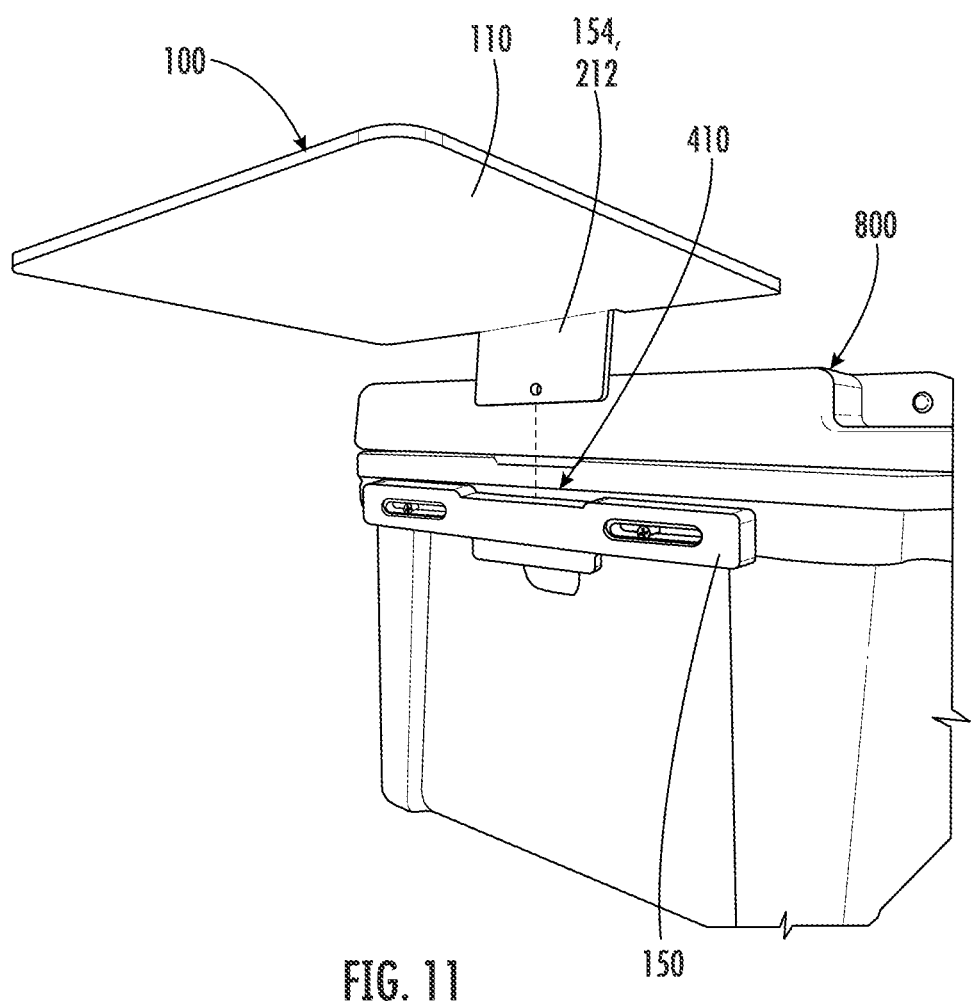
FIG. 11 is a side perspective view of the cooler of FIG. 8 and the table assembly of FIG. 1, with the mounting bracket affixed to the side of the cooler and the table aligned for insertion over the mounting bracket 150.
Figure 12:
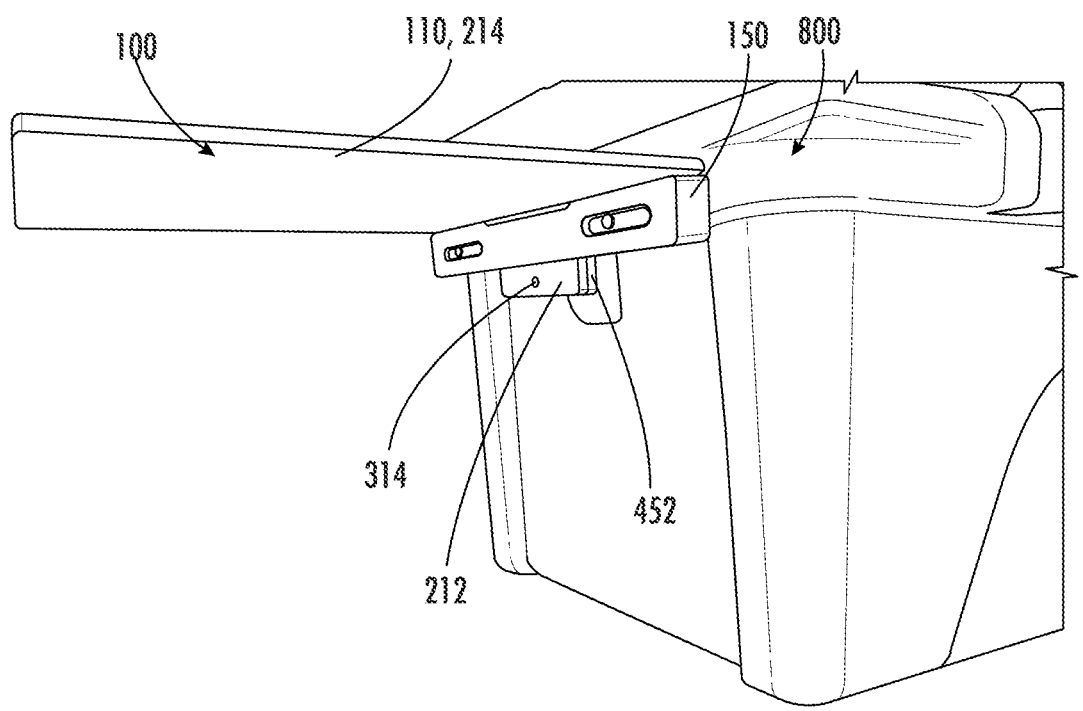
FIG. 12 is a bottom perspective view of the table assembly of FIG. 1 assembled and mounted to the cooler of FIG. 8.
Figure 13:
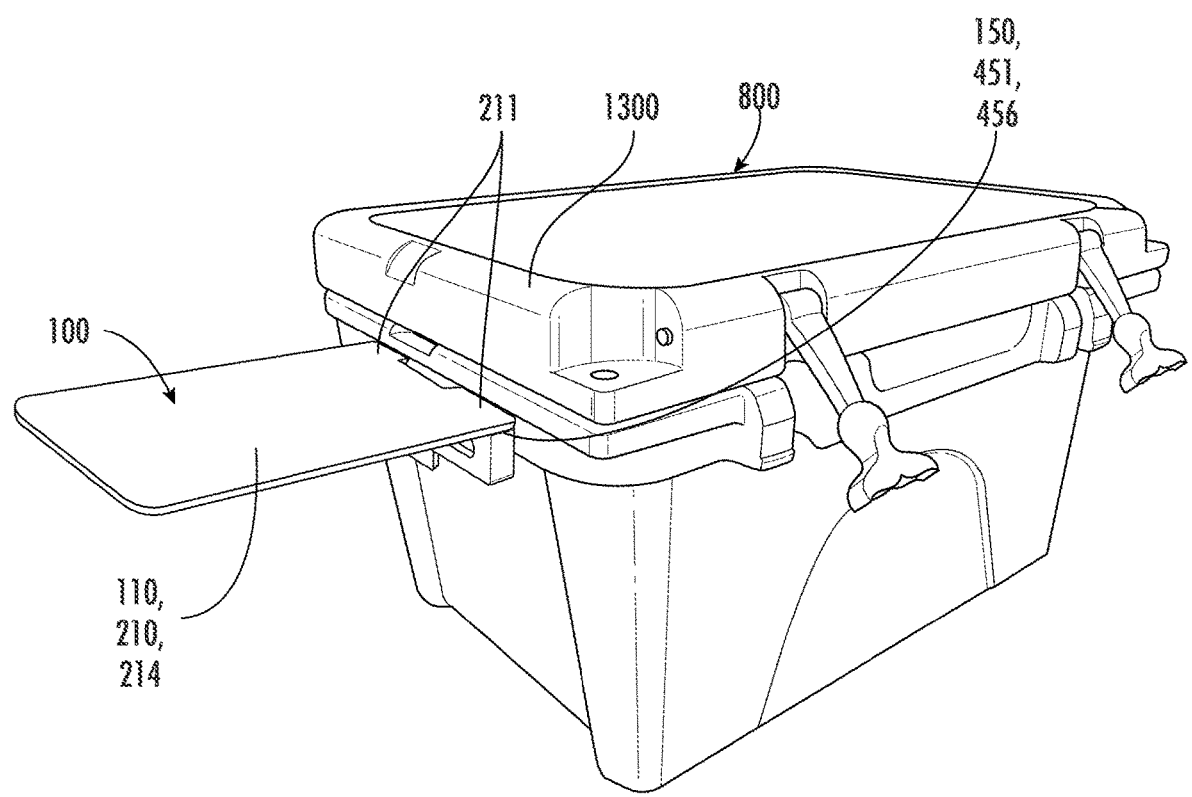
FIG. 13 is a top perspective view of the table assembly of FIG. 1 assembled and mounted to the cooler of FIG. 8.

As shown in FIG. 1 and described in greater detail with respect to FIGS. 11-13, the mounting slot 410 can receive the mounting portion 212 of the table 110 (shown in FIG. 2), and the mounting portion 212 can rest against the support tab 452. The recessed lip 460 can provide clearance for the bend 350 and the fillet 352 (each shown in FIG. 3).

Figure 6:
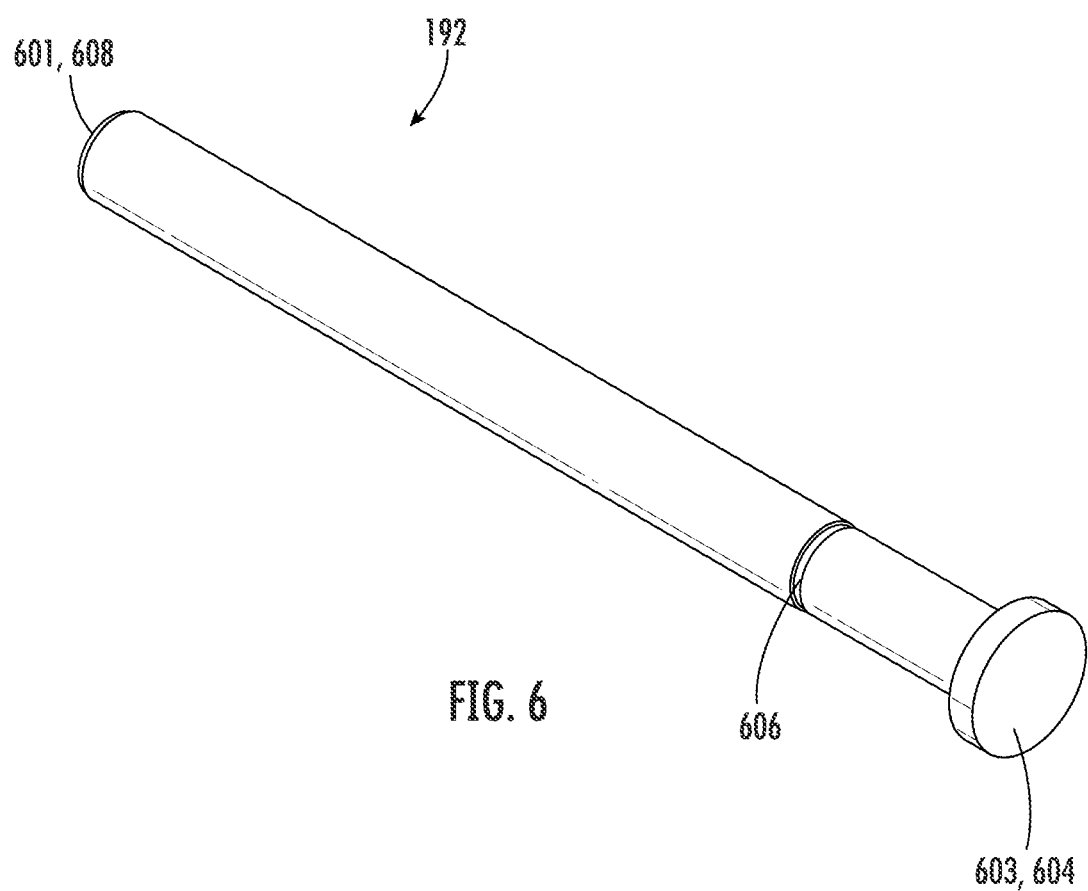
FIG. 6 is a perspective side view of an elongated members of the at least one fastener of FIG. 1.

FIG. 6 is a perspective side view of one of the elongated members 192 of fastener 190 of FIG. 1. The elongated member 192 can define a first end 601 and a second end 603. The first end 601 can define a transition shape 608. For example, the transition shape can be beveled, conical, frustoconical, rounded, hemispherical, dome-shaped, or any other suitable shape. The second end 603 can define a head 604, which can be enlarged relative to the remainder of the elongated member 192. In the present aspect, the elongated member 192 can be a pin, and with the exception of the head 604, a groove 606, and the transition shape 608 at the first end 601, the elongated member 192 can be substantially cylindrical. The groove 606 can be configured to receive the retention member 194 (shown in FIG. 1 and FIG. 7), which can secure the elongated member 192 through one of the fastener holes 152 (shown in FIG. 1). In other aspects, the elongated member 192 can be a bolt, a screw, a rivet, a pin, or any other type of suitable fastener, which can be configured for use with or without the retention member 194. For example and without limitation, a screw or rivet can be secured without a separate retention member 194. In some aspects, the elongated member 192 of each fastener 190 can define teeth, knurling, grooves, or other features, and the elongated member 192 can be configured to secure itself within a hole, with or without the retention member 194. In some aspects, the elongated member 192 can be a spring pin or roll pin, which can be configured to secure itself within a hole without the retention member 194.

Figure 7:
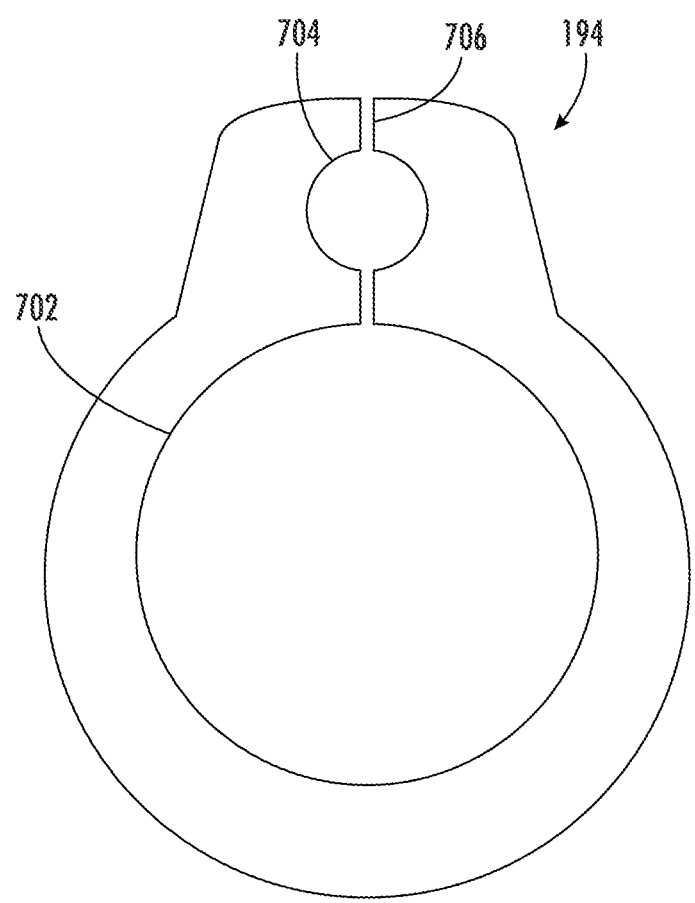
FIG. 7 is a front view of a retention member of the at least one fastener of FIG. 1.

FIG. 7 is a front view of the retention member 194. In the aspect shown, the retention member 194 can be a snap ring. The retention member 194 can define a primary opening 702 and a secondary opening 704. A split slot 706 can bisect the secondary opening 704 and intersect the primary opening 702. The primary opening 702 can be sized to fit the groove 606. The secondary opening 704 can be sized to receive snap ring pliers (not shown), or a similar tool, to aid in seating and removing the retention member 194 from the groove 606. In other aspects, the retention member 194 can be a different type of retention member, such as a nut, a cotter pin, a split pin, or any other suitable type of retention member.

Figure 8:
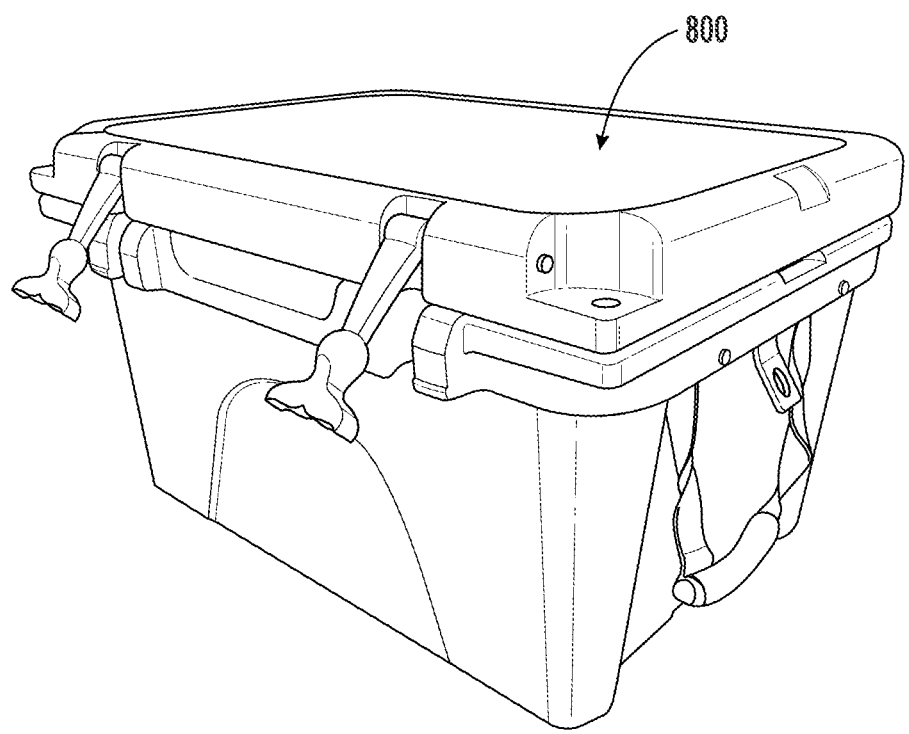
FIG. 8 is a perspective front view of a prior art cooler.
Figure 9:
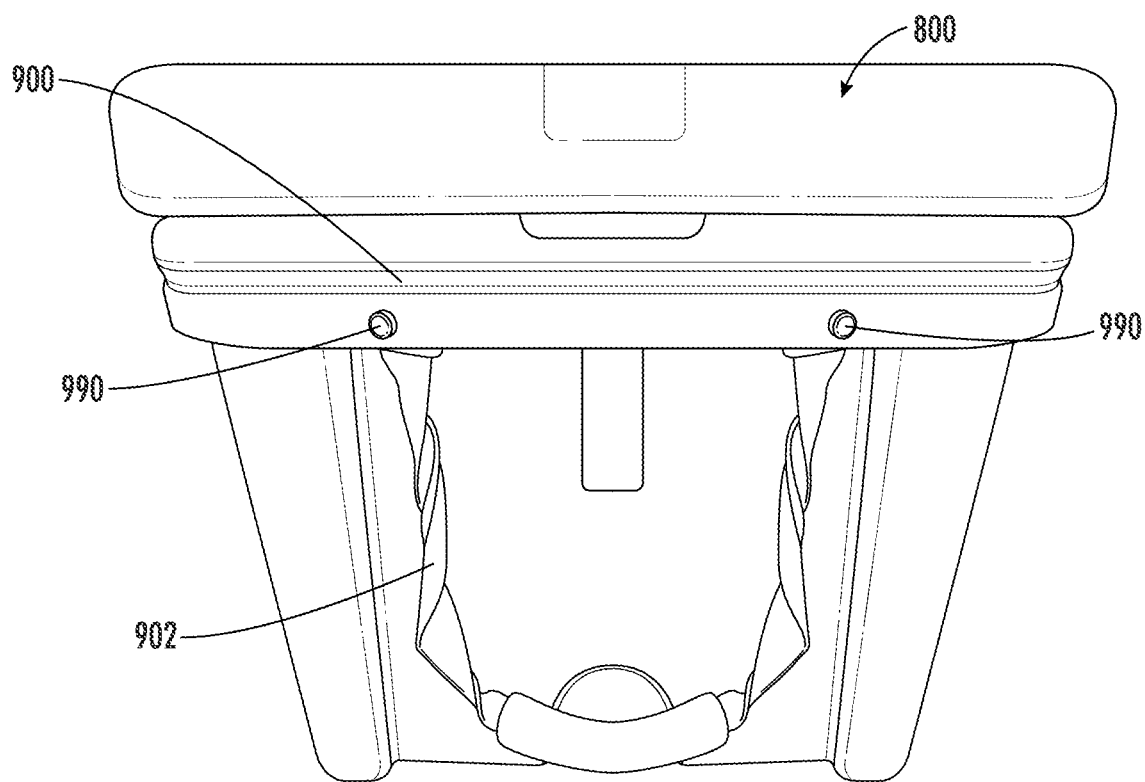
FIG. 9 is a side view of one of a pair of sides of the prior art cooler of FIG. 8.

FIG. 8 is perspective front view of a cooler 800, as is well known in the art. FIG. 9 is a side view showing one of a pair of sides 900 of the cooler 800. The cooler 800 can comprise a handle 902. The handle 902 can be affixed to the cooler by fasteners 990. In some aspects, the fasteners 990 can be similar to the fasteners 190 of FIG. 1. For example, the fasteners 990 can be a shorter version of the fasteners 190 of FIG. 1. The fasteners 990 can extend into holes (not shown) defined by the cooler 800 to secure the handle 902 to the cooler 800.

Figure 10:
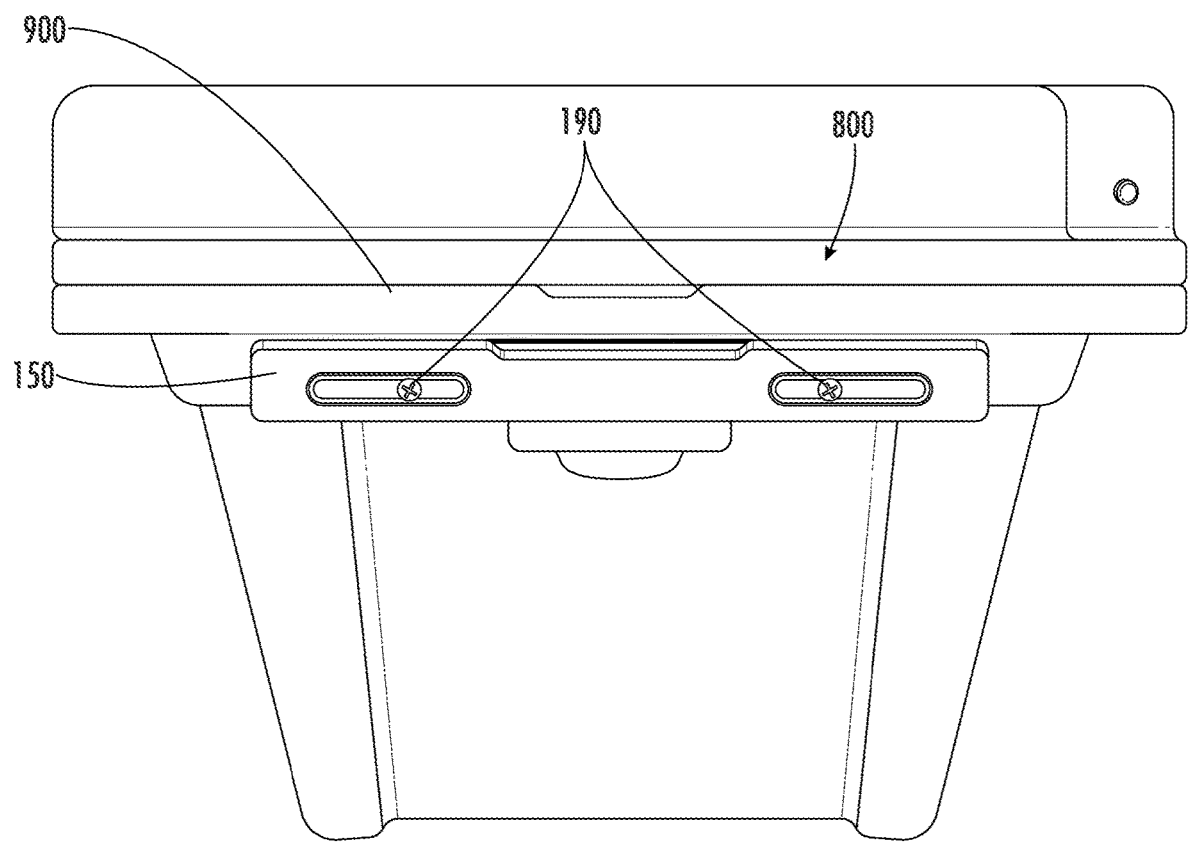
FIG. 10 is a side view of the cooler of FIG. 8 with the fasteners coupling the mounting bracket of the table assembly of FIG. 1 to the side.

FIG. 10 is a side view of the cooler 800 with the fasteners 190 coupling the mounting bracket 150 to the side 900. The fasteners 190 can replace the fasteners 990 (shown in FIG. 9) and can insert into the same holes (not shown) that receive the fasteners 990 in the prior art cooler 800. In the aspect shown, the fasteners 190 can be a different type of fasteners, such as bolts. Though not shown, in some aspects, the fasteners 190 can also affix the handle 902 (shown in FIG. 9) to the side 900, along with the mounting bracket 150. In some aspects, the handle 902 can be mounted between the side 900 and the mounting bracket 150.

FIG. 11 is a side perspective view of the cooler 800 and the table assembly 100, with the mounting bracket 150 affixed to the side 900 of the cooler and the table 110 aligned for insertion over the mounting bracket 150. To mount the table 110 to the mounting bracket 150, the mounting portion 212 can be inserted into the mounting slot 410, as shown in FIGS. 12 and 13.

As shown in FIG. 12, when the table 110 of the table assembly 100 is received within the mounting bracket 150, the mounting portion 212 can rest against the support tab 452, which acts to support the mounting portion 212 and thereby the table 110 to hold the table 110 level and support food, drink, and other items on the table 110. In the aspect shown, the mounting portion 212 can define the mounting hole 314. In some aspects, the mounting hole 314 can be threaded. In such aspects, the support tab 452 can define a complimentary threaded hole, and the mounting portion 212 can be fastened to the support tab 452. In other aspects, a fastener (not shown), such as a jack bolt, can be received by the mounting hole 314, and the fastener can be tightened or loosened to adjust the support portion 214. For example and without limitation, if the support portion 214 sags below horizontal, the fastener can be screwed into the mounting hole 314 to press upon support tab 452, thereby pushing the mounting portion 212 away from the support tab 452 and raising the support portion 214.

As shown in FIG. 13, the ears 211 can rest atop the top side 456 of the main body 451 of the mounting bracket 150. With the table assembly 100 assembled and coupled to the cooler 800, the top surface 210 of the support portion 214 of the table 110 can provide a surface for resting items, such as drinks or foods, for example and without limitation, without interfering with the operation of a lid 1300 of the cooler 800.

Figure 14:
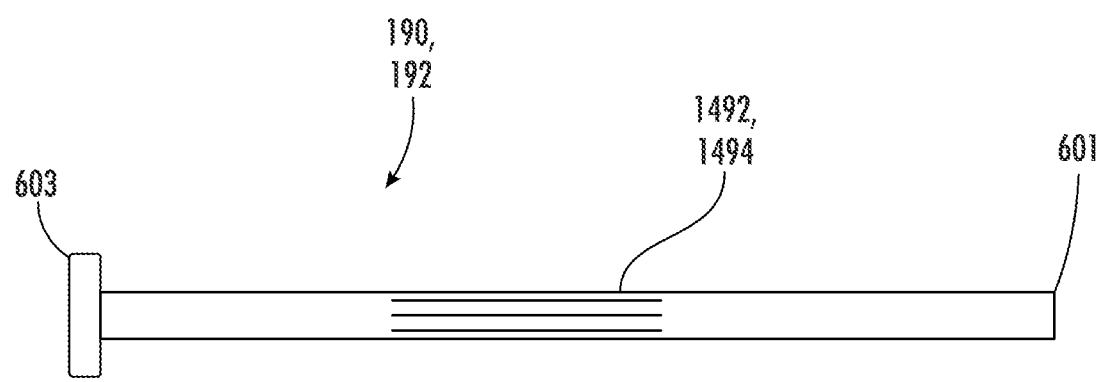
FIG. 14 is a side view of another aspect of a fastener in accordance with another aspect of the present disclosure.

FIG. 14 shows another aspect of the elongated body 192 of the fastener 190. The elongated body 192 can define knurling 1492 between the first end 601 and the second end 603. In the aspect shown, the knurling 1492 may only cover a middle portion spaced apart from each end 601,603. In some aspects, the knurling 1492 can extend to one or both of the ends 601,603. The knurling 1492 can comprise a plurality of raised ridges 1494. In the present aspect, the raised ridges 1494 can extend in a lengthwise direction between the ends 601,603. In some aspects, the raised ridges 1494 can define a spiral or helical shape.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A table assembly comprising:
    a table comprising a support portion and a mounting portion; and
    a mounting bracket defining a main body defining a top side and a bottom side, the mounting bracket defining a mounting slot extending from the top side to the bottom side and comprising a side, the mounting slot receiving the mounting portion, the mounting bracket comprising a support tab engaging the mounting portion, the support tab comprising a bottom side extending downwards along the side of the mounting slot.

2. The table assembly of claim 1, wherein the support portion is cantilevered.

3. The table assembly of claim 1, wherein the support portion is substantially perpendicular to the mounting portion.

4. The table assembly of claim 1, wherein the table defines a pair of ears, and wherein the mounting portion is positioned between the pair of ears.

5. The table assembly of claim 1, wherein the mounting bracket defines at least one fastener hole.

6. A cooler assembly comprising:
    a cooler; and
    a table assembly comprising:
        a table comprising a support portion and a mounting portion; and
        a mounting bracket defining a main body comprising a top side and a bottom side, the mounting bracket defining a mounting slot extending from the top side to the bottom side and comprising a support tab engaging the mounting portion of the table assembly, the mounting slot comprising a side, the support tab comprising a bottom side extending downwards along the side of the mounting slot, and the mounting bracket coupled to the cooler.

7. The cooler assembly of claim 6, wherein the cooler defines a side, wherein the mounting bracket is coupled to the side, and wherein the support portion extends outwards from the side.

8. The cooler assembly of claim 7, wherein the support portion is substantially perpendicular to the side.

9. The cooler assembly of claim 6, further comprising at least one fastener coupling the mounting bracket to the cooler.

10. The cooler assembly of claim 9, wherein the mounting bracket defines a fastener hole, and wherein the fastener hole receives a fastener of the at least one fastener.

11. The cooler assembly of claim 10, wherein the fastener hole extends through the mounting bracket from a front side of the mounting bracket to a rear side of the mounting bracket, and wherein the mounting slot extends from a top side to a bottom side of the mounting bracket.

12. The cooler assembly of claim 6, wherein the support portion is substantially perpendicular to the mounting portion.

13. A method for utilizing a table assembly comprising a table and a mounting bracket, the method comprising:
    aligning a mounting portion of the table with a mounting slot of the mounting bracket, the mounting bracket comprising a support tab, the mounting slot comprising a side and the support tab comprising a bottom side extending downwards along the side of the mounting slot; and
    inserting the mounting portion into the mounting slot to couple the table to the mounting bracket, wherein the mounting portion engages the support tab.

14. The method of claim 13, wherein the mounting portion is substantially perpendicular to a support portion of the table.

15. The method of claim 14, wherein the method further comprises resting an object on the support portion.

16. The method of claim 13, wherein the table defines a pair of ears, and wherein the mounting portion is positioned between the pair of ears.

17. The method of claim 13, wherein the mounting bracket is coupled to a cooler.

18. The method of claim 13, wherein the mounting bracket defines a top side and a bottom side, and wherein the mounting slot extends from the top side to the bottom side.

\* \* \* \* \*